United States Patent [19]

Boon

[11] 4,057,262
[45] Nov. 8, 1977

[54] LOG TRANSPORTER

[76] Inventor: William David Boon, 501 W. 5th St., Portageville, Mo. 63873

[21] Appl. No.: 688,319

[22] Filed: May 20, 1976

[51] Int. Cl.² .......................................... B62D 61/00
[52] U.S. Cl. ................................... 280/78; 214/1 QB
[58] Field of Search ................. 280/78, 205, 206, 207, 280/208; 214/1 QB

[56] References Cited

U.S. PATENT DOCUMENTS

| 1,307,255 | 6/1919 | Hookey | 214/1 QB |
| 3,464,718 | 9/1969 | Fisher | 280/206 |

FOREIGN PATENT DOCUMENTS

| 1,158,498 | 7/1969 | United Kingdom | 280/78 |

Primary Examiner—Robert R. Song

Attorney, Agent, or Firm—Schuyler, Birch, Swindler, McKie & Beckett

[57] ABSTRACT

A transporter comprising a pair of spaced hoops interconnected by a plurality of generally U-shaped spokes extending inwardly from the inner diameter of the hoops to form a central, generally circular opening. In order to provide a load carrying enclosure, band means such as ropes, chains, or cables are wrapped substantially around the central portions of the spokes. An opening is provided between any two adjacent spokes by not extending the bands entirely around all the spokes so that items may be placed into the load carrying enclosure. When the enclosure is full a load retaining means such as a tightener is fastened across the opening to pack the items together tightly and render them ready for transportation by rolling the transporter along a surface.

8 Claims, 4 Drawing Figures

LOG TRANSPORTER

BACKGROUND OF THE INVENTION

1. Field of the Invention

The invention relates to transporters and, more particularly, to an improved log transporter adapted to be rolled along a surface whereby a large supply of logs may be transported conveniently.

2. Description of the Prior Art

In the log transporting art, the transportation of a large supply of logs previously has been difficult. For example, it is well known simply to load a supply of logs in a box and carry the loaded box from a log pile to the fireplace. Alternatively, a loaded box or a supply of logs may be transported by wheelbarrow or other vehicle. These conventional techniques of log transportation, however, involve great physical exertion and inconvenience. If a lesser supply of logs is transported, many trips are required. Frequently, elderly or infirm persons may not be able to transport enough logs to a fireplace to insure the desired operation of the fireplace. Moreover, log transporters such as wheelbarrows often are unsightly and will be placed far from the fireplace, thus necessitating many trips to the wheelbarrow to replenish the fireplace.

SUMMARY OF THE INVENTION

Among the objects of the present invention is to avoid the disadvantages of prior log transporting devices and to provide a new and improved log transporter adapted to be rolled along a surface whereby a large supply of logs may be transported with a minimum of physical exertion.

It is another object of the invention to provide a log transporter having sufficient capacity to transport such a large supply of logs that the number of trips to a log pile is minimized greatly.

It is yet another object of the present invention to provide a log transporter pleasing in appearance and capable of storing a large supply of logs close by a fireplace.

According to the present invention there is provided a transporter comprising a pair of hoops interconnected by a plurality of generally U-shaped spokes. The hoops are disposed in spaced, side-by-side relationship and the spokes extend inwardly from the inner diameter of each of the hoops to form a central, generally circular opening. In order to provide a load carrying enclosure, band means such as ropes, chains or cables are wrapped about the inner portions of the spokes. This is done in such a manner that an opening remains between any two adjacent spokes through which items may be placed into the load carrying enclosure. When the enclosure is full a load retaining means such as an elastic, rope or chain tightener is fastened across the opening to pack the items together tightly, thus rendering them ready for transportation by rolling the hoops along the ground.

DESCRIPTION OF THE PREFERRED EMBODIMENT

Figure 1:
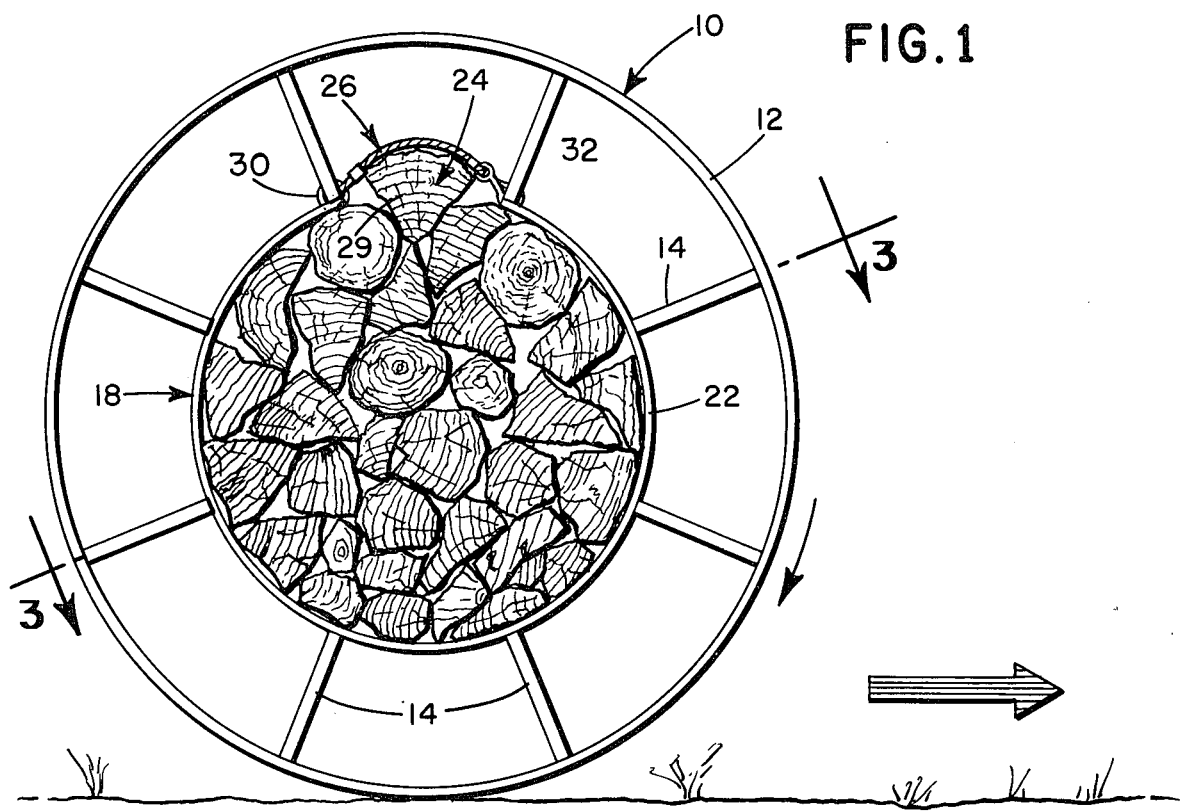
FIG. 1 is a side elevational view of a log transporter according to the invention showing the transporter in use.

Referring to the drawings there is shown a log transporter 10 comprising a pair of spaced steel hoops 12 disposed in side-by-side relationship. The hoops are interconnected by a plurality of substantially identical, generally U-shaped spokes 14. The spokes, at their outer ends, are affixed rigidly to hoops 12 at the inner diameter thereof, as at 16. Such connection may be made in any suitable manner such as by welds, bolted fasteners, or brackets.

It will also be observed from FIG. 1 that spokes 14 are disposed uniformly within hoops 12, that is, each of the spokes is spaced radially from an adjacent spoke the same angular distance. By this construction, transporter 10 is well balanced and stresses placed on the transporter are distributed uniformly.

Figure 4:
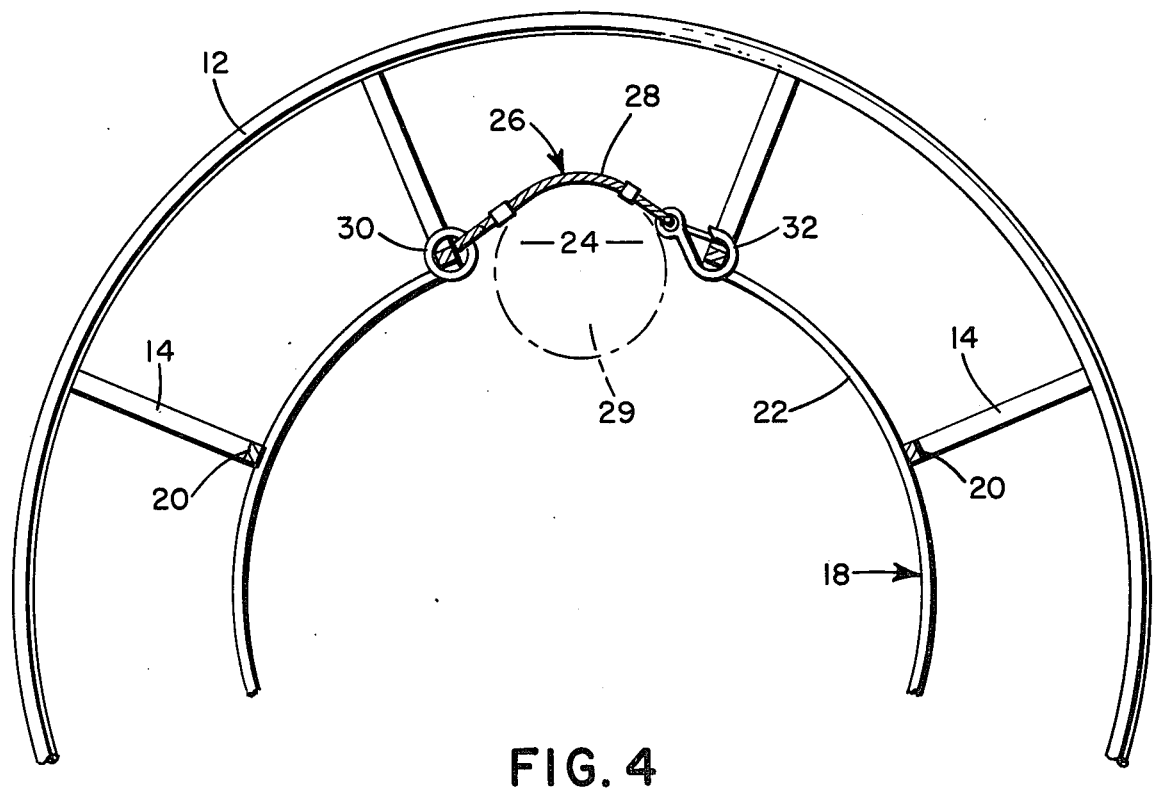
FIG. 4 is a view taken along line 4—4 of FIG. 2 showing the load retaining means in more detail.

It will also be observed from FIGS. 1 and 4 that spokes 14 extend inwardly to form a central, generally circular opening. In order to provide a load carrying enclosure, a hub 18, is provided. Hub 18 is comprised of a central portion 20 formed by the inner ends of spokes 14 having band means 22 affixed thereto. Band means 22 may be comprised of any well known elements such as ropes, chains, cables, or strap steel. Whatever type of band means employed, however, it is necessary only that the bands be rigidly affixed to central portions 20 and that an opening, as at 24, be left between any two adjacent spokes. As with the connection of spokes 14 to hoops 12, band means 22 may be affixed to central portions 20 in any well-known manner such as by welds, bolted fasteners or brackets.

Figure 2:
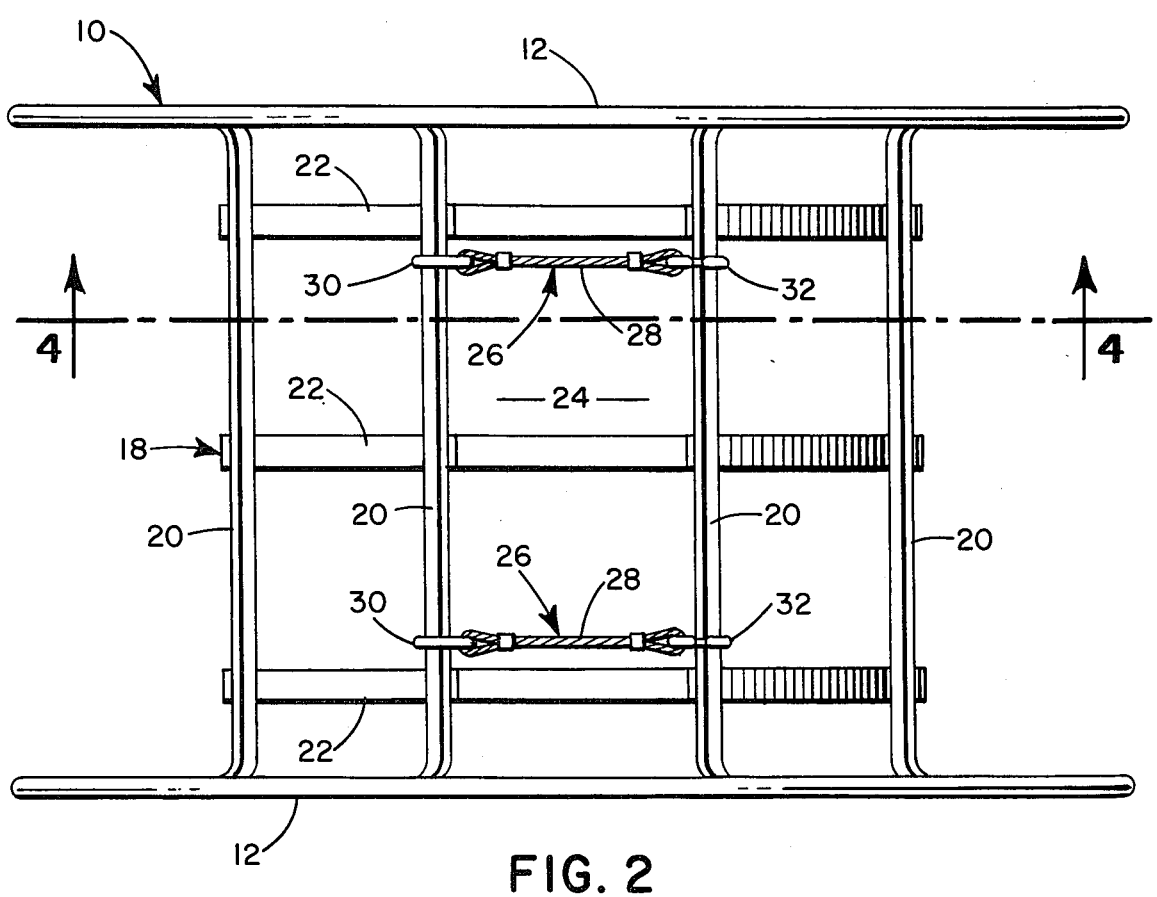
FIG. 2 is a top plan view of the log transporter of FIG. 1.
Figure 3:
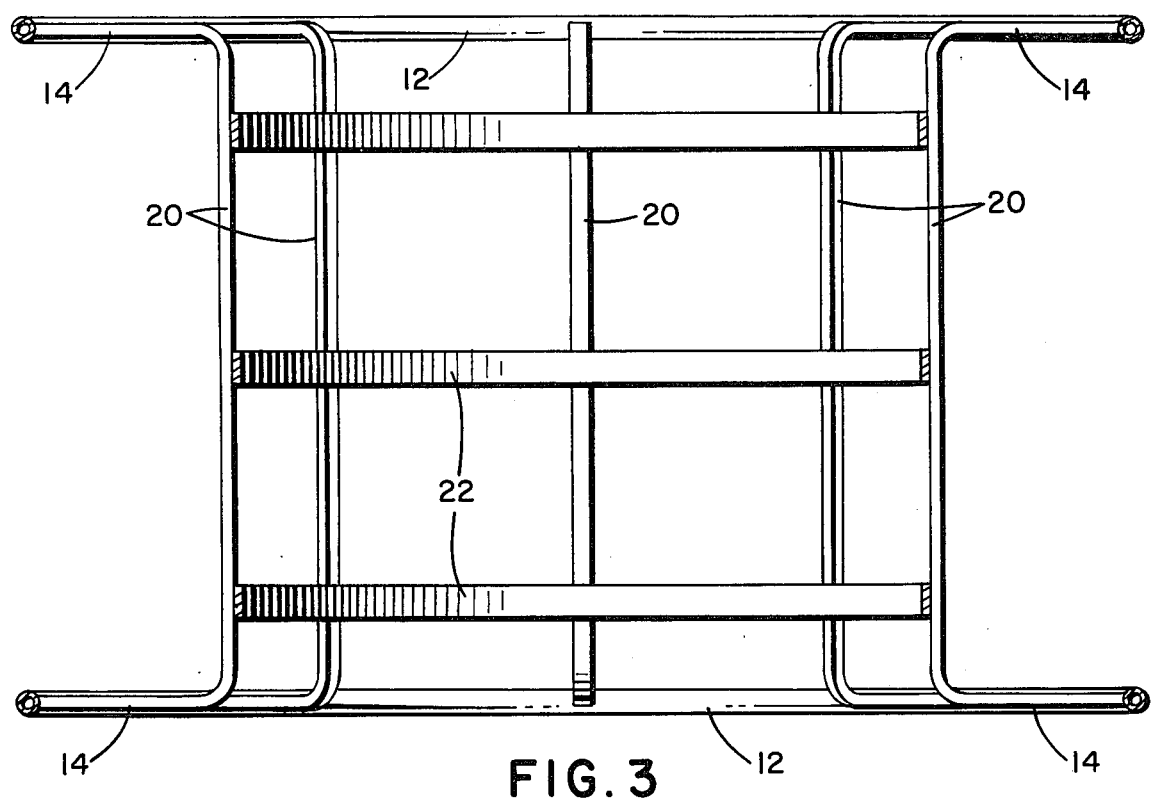
FIG. 3 is a view taken along line 3—3 of FIG. 1, with the logs removed for clarity.

In order to retain items placed within the load carrying enclosure or hub 18, at least one load retaining means, or tightener 26, is connected to spokes 14 across opening 24. Tightener 26 may be of any well known construction, such as a conventional chain tightener, rope, or elastic cord. The latter construction is illustrated in FIGS. 1, 2 and 4, wherein tightener 26 comprises elastic cord 28 connected to central portions 20 by rings 30 and clips 32.

While the dimensions and materials used in fabricating the transporter may be varied, in one convenient embodiment of the transporter the hoops are approximately 40 inches in diameter and constructed of one half inch diameter steel pipe or rod. The hoops are spaced 24 inches apart. The central load carrying enclosure is approximately 24 inches in diameter.

In operation, logs to be transported are loaded within hub 18 through opening 24 until hub 18 is nearly full. Thereafter, an additional or key log 29 is placed into hub 18 such that the log projects slightly beyond central portions 20. Tighteners 26 then are connected to central portions 20 across opening 24 to compress the last-placed log and render the load ready for transportation. When the transporter is rolled one revolution the logs may shift and arrange into a small sized load. At this time the tighteners may have to be tightened and, if necessary, another log added. It is important to keep the load under tension in order to maintain stability. This method of loading is preferred because the entire load may be compressed tightly so that shifting of the load during transportation is prevented. With tighteners 26 in place, hoops 12 may be rolled along the ground wherever desired.

It is pointed out that the dimensions of the transporter may be varied as desired and that any well known materials may be used to fabricate the transporter, provided that the transporter has sufficient strength to carry its anticipated load. Moreover, the transporter of the present invention is not limited to transporting logs, it being apparent that many types of items may be retained within load carrying enclosure or hub 18 and carried accordingly.

By the present invention, it is seen that a large supply of items, whether logs or otherwise, may be transported conveniently with little effort. As described, the transporter may carry as much as 200 pounds or more of logs. This, of course, means that less trips to a log pile are required than with conventional prior art transporters. Moreover, the transporter of the present invention is pleasing in appearance and may be placed conveniently near the fireplace to minimize the distance required to carry the logs from the transporter to the fireplace.

While a specific embodiment of the invention has been described, it will be obvious to those skilled in the art that changes and modifications may be made without departing from the invention. It is therefore intended in the appended claims to cover all such changes and modifications that fall within the true spirit and scope of the invention.

I claim:

1. A transporter comprising:
  a. a pair of spaced hoops,
  b. a plurality of spokes interconnecting said hoops,
  c. means interconnecting said spokes to form a load carrying enclosure, wherein said spokes are generally U-shaped, each of said spokes having outer end portions connected to said hoops and a central portion which defines a portion of said load carrying enclosure, and
  d. load retaining means connecting at least two of said spokes to retain a load carried within said load carrying enclosure.

2. The apparatus of claim 1 wherein said means interconnecting said spokes provides an opening into said load carrying enclosure between any two adjacent spokes, and said load retaining means is connected to said adjacent spokes across said opening.

3. The apparatus of claim 1, wherein said load carrying enclosure is substantially centered within said hoops.

4. The apparatus of claim 1 wherein said means interconnecting said spokes is affixed to said central portion of said spokes.

5. A transporter comprising:
  a. a pair of spaced hoops,
  b. a plurality of spokes interconnecting said hoops,
  c. each of said spokes being generally U-shaped and having outer end portions connected to said hoops and an inner central portion,
  d. means affixed to said central portions of said spokes interconnecting said spokes to form a load carrying enclosure,
  e. said means interconnecting said spokes providing an opening into said load carrying enclosure, and
  f. load retaining means connected to adjacent spokes across said opening.

6. A transporter comprising:
  a. a pair of transversely spaced hoops,
  b. a plurality of spaced spokes extending between and substantially rigidly interconnecting said hoops,
  c. means for interconnecting a majority of said spokes to form a load carrying enclosure, and
  d. load retaining means connecting the remaining ones of said spokes not connected by said interconnecting means to retain a load carried within said load carrying enclosure.

7. The apparatus of claim 6, wherein each of said spokes includes end portions connected to said hoops and a central portion radially disposed inwardly from said hoops, and said interconnecting means is secured to said central portion of each of said majority of said spokes such that said load carrying enclosure is radially spaced inwardly from said hoops.

8. The apparatus of claim 6, wherein said interconnecting means is secured to all but two adjacent ones of said spokes, and said load retaining means extends between said two adjacent spokes.

* * * * *